(12) United States Patent
Harms et al.

(10) Patent No.: US 6,348,086 B1
(45) Date of Patent: Feb. 19, 2002

(54) COMBINATION BLOWER WHEEL AND FILTER CARTRIDGE SYSTEM FOR HVAC APPLICATIONS

(75) Inventors: Michael R. Harms; Charles D. Cowman, both of Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/504,474

(22) Filed: Feb. 16, 2000

(51) Int. Cl.$^7$ .......................... B01D 53/06; B01D 46/26
(52) U.S. Cl. .............. 96/125; 96/135; 96/140; 96/142; 96/153; 55/385.3; 55/407; 55/438; 55/471; 55/473; 55/515
(58) Field of Search .............................. 55/385.3, 400, 55/401, 407, 437–439, 471, 473, 515, 516, 521; 96/121, 123, 125, 129, 135, 139, 140, 142, 153, 154

(56) References Cited

U.S. PATENT DOCUMENTS

| | | | | |
|---|---|---|---|---|
| 3,877,907 A | * | 4/1975 | Elliff ........................ 55/510 X |
| 3,941,034 A | * | 3/1976 | Helwig et al. ............ 96/139 X |
| 4,130,487 A | * | 12/1978 | Hunter et al. ............. 96/139 X |
| RE30,782 E | * | 10/1981 | Van Turnhout .............. 264/22 |
| 4,817,942 A | * | 4/1989 | Begon ......................... 272/98 |
| 5,120,331 A | * | 6/1992 | Landy ...................... 96/135 X |
| 5,188,644 A | * | 2/1993 | Landy ...................... 96/121 X |
| 5,221,292 A | * | 6/1993 | Aoyama ................ 55/385.3 X |
| 5,230,800 A | * | 7/1993 | Nelson ........................ 210/496 |
| 5,265,348 A | * | 11/1993 | Fleishman et al. ............. 34/97 |
| 5,332,426 A | * | 7/1994 | Tang et al. .................... 96/153 |
| 5,350,444 A | * | 9/1994 | Gould et al. ................... 96/154 |
| 5,354,365 A | * | 10/1994 | Youn ............................ 96/135 |
| 5,431,716 A | * | 7/1995 | Ebbeson ................... 96/154 X |
| 5,683,478 A | * | 11/1997 | Anonychuk ................ 55/385.3 |
| 5,878,590 A | * | 3/1999 | Kadle et al. ............. 96/125 X |
| 6,004,365 A | * | 12/1999 | Fiacco ...................... 55/507 X |
| 6,099,608 A | * | 8/2000 | Harms et al. ................. 55/400 |
| 6,099,609 A | * | 8/2000 | Lira et al. ..................... 55/400 |
| 6,102,988 | * | 8/2000 | Tang et al. ............... 55/400 X |

FOREIGN PATENT DOCUMENTS

| | | | | |
|---|---|---|---|---|
| DE | 2844770 | * | 4/1980 | ................... 96/139 |
| EP | 0517021 | * | 12/1992 | ................... 96/154 |
| GB | 2232094 | * | 12/1990 | ................... 96/135 |
| JP | 63-162022 | * | 7/1988 | ................... 96/154 |
| JP | 63-205115 | * | 8/1988 | ................... 96/135 |
| JP | 03-086209 | * | 4/1991 | ................... 96/135 |
| JP | 03-098609 | * | 4/1991 | ................... 96/129 |

\* cited by examiner

*Primary Examiner*—Robert H. Spitzer
(74) *Attorney, Agent, or Firm*—Gary L. Griswold; Robert W. Sprague; William J. Bond

(57) ABSTRACT

In one embodiment, the filter cartridge comprises a mesh structure forming a generally annular cylinder comprising a center opening, a plurality of compartments containing a filter medium, and spaces between the compartments. The spaces between the compartments comprise substantially unimpeded airflow passages that permit airflow even when the filter medium is fully loaded.

26 Claims, 11 Drawing Sheets

COMBINATION BLOWER WHEEL AND FILTER CARTRIDGE SYSTEM FOR HVAC APPLICATIONS

FIELD OF THE INVENTION

The present invention relates to a filtration system releasably attachable to a blower wheel in an HVAC system, and in particular, to a filter cartridge having a plurality of compartments containing a filter medium and a plurality of substantially unimpeded air flow passages that maintain a high flow rate even when the filter medium is in a fully loaded state.

BACKGROUND OF THE INVENTION

With increased concern over environmental air quality, innovative solutions have been sought for adding filtration capacity to new and existing air circulation systems, such as heating, ventilation, and cooling systems (HVAC) for buildings and vehicles. For example, the HVAC systems in most vehicles do not include air filters. Minimal space is generally available for retrofitting a filter to the HVAC system. Moreover, it may be necessary to provide one filter for incoming air and a second filter for air recirculating within the passenger compartment. Even on new vehicles, space within the HVAC system is at a premium and it is difficult for some manufacturers to provide a location for an appropriate filter.

In addition to the difficulty of finding sufficient space for a filter, the failure mode of most filter media also raises concerns. Over time, environmental contaminants accumulate in filters, typically resulting in a reduced flow rate through the air circulation system. Failure to replace the filter media periodically can result in an increased static air pressure drop across the filter and reduced efficiency for the air circulation system. The reduced flow rate through a loaded filter can also create safety hazards, such as allowing insufficient airflow for operating the defrost system of an HVAC system.

One approach to retrofitting an air filter to an HVAC system of a vehicle is disclosed in U.S. Pat. No. 5,683,478 (Anonychuk). The air filter is sized and shaped to fit into a cavity located within a blower motor assembly. An outwardly extended lip is provided on the base of the air filter for rigid attachment to a rim located below the fan on the automobile. The fan in the blower motor assembly rotates around the stationary filter. Although the '478 patent recognizes the need to provide filtration efficiency without impeding airflow, air flow will inevitably be reduced as the filter becomes loaded with environmental contaminants. The failure mode of the filter element may be an unacceptable reduction in airflow through the blower motor assembly.

U.S. Pat. No. 5,265,348 (Fleishman et al.) discloses the use of a rotating foam material on a rotary fan to reduce noise.

Various filters for blower wheels are disclosed in commonly assigned U.S. patent applications Ser. No. 09/126,189 (now U.S. Pat. No. 6,099,608, issued Aug. 8, 2000), entitled Filtration System for HVAC Applications; Ser. No. 09/126,190 (now U.S. Pat. No. 6,099,609, issued Aug. 8, 2000), entitled Moving Sorbent Filter Device; and Ser. No. 09/126,181 (now U.S. Pat. No. 6,102,988, issued Aug. 15, 2000), entitled Moving Filter Device having Filter Elements with Flow Passages and Method of Filtering Air, all filed on Jul. 30, 1998.

BRIEF SUMMARY OF THE INVENTION

The present invention is directed to a filtration system attachable to a blower wheel in an HVAC system. The present filtration system is particulary useful to provide cabin air filtration to vehicles, which currently do not have a filter designed in the HVAC system. Movement of the filter cartridge with the blower wheel increases filtration efficiency during blower operation. The present moving filter cartridge can be retrofitted to most existing blower wheels. The filter cartridge releasably attaches to either the outside perimeter or the inside perimeter of the blower wheel.

An advantage of the present filtration system is that it is retrofittable into most existing vehicles. Since most cars have a blower wheel, a space exists to place the present filter cartridge. On the other hand, it is not feasible to easily retrofit a vehicle with a conventional cabin air filter since little additional space is available. Locating the filter cartridge at the blower wheel provides filtration of both outside air entering the HVAC system and air being recirculated within the system. Most cabin air filters only filter the air as it enters the vehicle.

The present filter cartridge includes both compartments containing a filter medium and flow passages of a size, density and shape such that a high flow rate is maintained even when the filter media is fully loaded. The spinning action of the filter cartridge causes the filter medium contained in the compartments to impact air as it passes through the flow passages. Some loss of filtration efficiency due to the flow passages is offset by increased efficiency due to the movement of the filter cartridge with the blower wheel.

The filtration system rotates in conjunction with a blower wheel. The blower wheel has a plurality of fan blades arranged in a spaced relationship radially around a blower cavity. The blower wheel defines a flow path extending radially outward from the blower cavity and through the fan blades when the blower wheel is rotating. The present filtration system can reduce the airflow through the blower wheel, thereby reducing the power consumption of the motor. The relationship between power and flow is a cubic function. By reducing the load (i.e., power consumption), the life of the motor is extended.

In one embodiment, the filter cartridge comprises a mesh structure forming a generally annular cylinder comprising a center opening, a plurality of compartments containing a filter medium, and spaces between the compartments. The spaces between the compartments comprise substantially unimpeded airflow passages that permit airflow even when the filter medium is fully loaded.

The compartments may extend radially into the center opening. In one embodiment, the compartments comprise one of corrugations or pleats in one or more of the mesh layers. The compartments can be shaped to operate as fan blades. The compartments are typically discrete pockets. The mesh typically comprises an expanded metal screen. In one embodiment, a mesh material extends across a top opening of the annular cylinder. The filter medium can be selected from a group consisting of electret charged medium, particulate medium, sorbents medium, agglomerated carbon or combinations thereof.

The filter cartridge comprises at least one end cap. An air flow passage can optionally extend through the at least one end cap. The end cap can also include weight balancing cavities and/or removable weight balancing tabs.

In another embodiment, the filter cartridge comprises a first mesh layer having a plurality of raised portions and a second mesh layer engaged with the first mesh layer such that the raised portions comprise compartments. A filter medium is retained in the compartments. Spaces between the compartments comprise substantially unimpeded airflow passages that permit airflow even when the filter medium is fully loaded. The filter medium is preferably agglomerated carbon or other filter medium such as activated carbon or other sorbent materials that remove odors and gases from the air, such as diesel exhaust, car exhaust, urban or farm smells, carbon monoxide, and ozone.

DETAILED DESCRIPTION OF THE INVENTION

Figure 1:
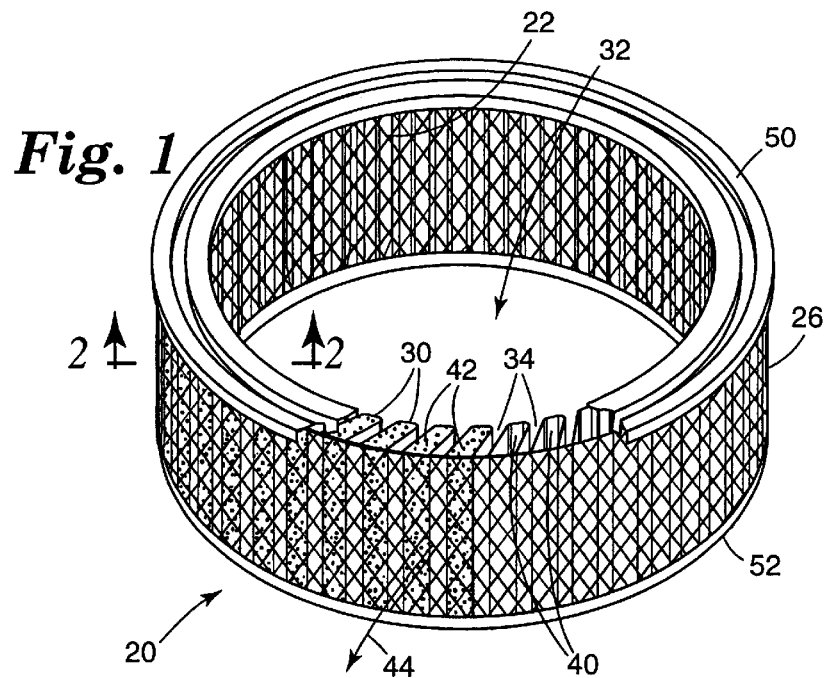
FIG. 1 is a perspective view of a filter cartridge in accordance with the present invention.
Figure 1A:
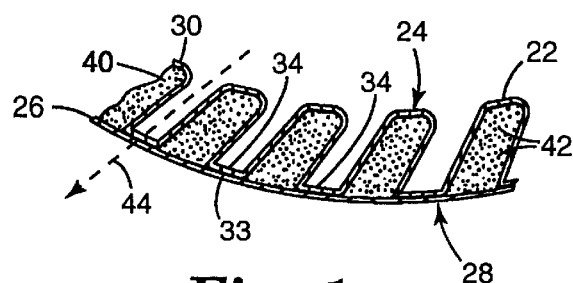
FIG. 1a is a sectional top view of the filter cartridge of FIG. 1.
Figure 2A:
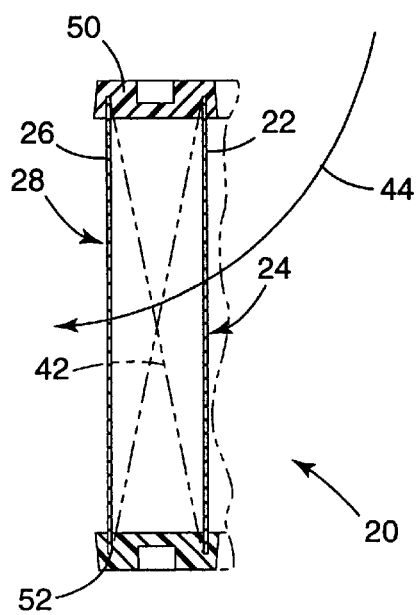
FIG. 2a is a sectional view of the filter cartridge of FIG. 1.

FIGS. 1, 1a and 2a illustrate a filter cartridge 20 in accordance with the present invention. The filter cartridge 20 includes a first mesh layer 22 defining an inner filter surface 24 and a second mesh layer 26 defining an outer filter surface 28. The first mesh layer 22 includes a plurality of raised portions 30 that protrude into center opening 32 of the filter cartridge 20. Gaps or spaces 34 located between the raised portions 30 on the first mesh layer 22 are abutted against the second mesh layer 26 so that the raised portions 30 define a plurality of compartments 40. The compartments 40 are preferably filled with a filter medium 42 (see e.g., FIG. 1a). In the illustrated embodiment, each of the compartments 40 define a discrete pocket that does not communicate with the adjacent compartments. In an alternate embodiment, the compartments 40 can be formed in a single mesh layer, obviating the second mesh layer.

The gaps or spaces 34 between the compartments 40 comprise air flow passages 44 that allow for high initial air flow through the filter cartridge 20, that does not decrease over time. That is, the air flow passages 44 are substantially unimpeded when the filter medium 42 is fully loaded.

The filter cartridge 20 includes a top cap 50 and a bottom cap 52. As best illustrated in FIG. 2a, the caps 50, 52 serve to secure the first and second mesh layers 22, 26 together. The caps 50, 52 can also be used to retain the filter medium 42 in the filter cartridge 20. The caps 50, 52 can be constructed from a variety of materials, such as plastisol. Flexible caps constructed from plastisol or other elastomeric material enhance conformability of the filter cartridge 20 and provide a friction fit with a blower wheel.

The first and second mesh layers 22, 26 can be constructed from a variety of polymeric or metal screens or scrims. In the embodiment illustrated in FIG. 1, the first and second mesh layers 22, 26 are constructed from expanded metal. The mesh layers 22, 26 have a substantial open area of about 70% or greater. The interface 33 between the gaps 34 on the first mesh layer 22 with the second mesh layer 26 may be held together by adhesives, spot welding or a variety of other techniques.

When using loose particle filter media 42, the size or diameter of the openings in the mesh layers 22, 26 is preferably smaller than the smallest dimension of the particles. Alternatively, agglomerated carbon can be located in the compartments 40 and heat set to form a unitized sorbent mass. Consequently, the open area of the first and second mesh layers 22, 26 can be dramatically increased. Molded carbon particle agglomerate suitable for use in the present filter cartridge 20 are disclosed in U.S. Pat. No. 5,332,426 (Tang et al.).

Figure 1B:
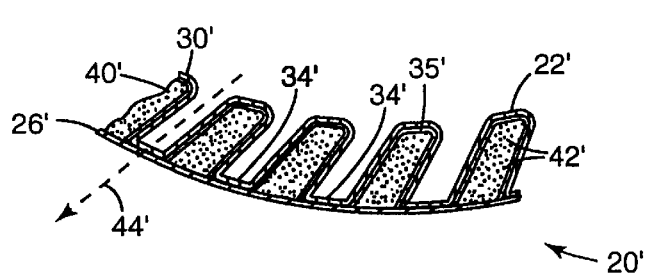
FIG. 1b is a sectional top view of an alternate filter cartridge in accordance with the present invention.

FIG. 1b illustrates an alternate embodiment of the filter cartridge 20' having a web 35' that follows the contour of the first mesh layer 22'. The web 35' may be a particle filter or a scrim to assist in retaining the filter medium 42' in the compartments 40'. For example, the web 35' may be useful to retain loose carbon in the compartments 40'. Preventing the filter medium 42' from escaping from the compartments 40' is important to prevent weight imbalances in the filter cartridge 20' from forming during usage. In another embodiment, the web 35' is a particle filter located generally in the center of the compartments 40' and substantially surrounded by filter medium 42'. In yet another embodiment, the web 35' is located on the outer surface of mesh layer 22'.

The filter cartridge 20' can be constructed using a variety of techniques. For example, the web 35' can be bonded or laminated to the first mesh layer 22' either before or after formation of the raised portions 30'. Once the raised portions 30' are formed, the portion of the web 35' located along the gaps 34' is removed using mechanical or thermal processes. Consequently, the second mesh layer 26' is positioned directly against the first mesh layer 22' so that the flow passages 44' are substantially unimpeded by the web 35'. In another embodiment, the portions of the web 35' along the gaps 34' are not removed provided the web 35' is sufficiently porous. That is, the web 35' can form a continuous layer around the filter 20'.

Figure 2B:
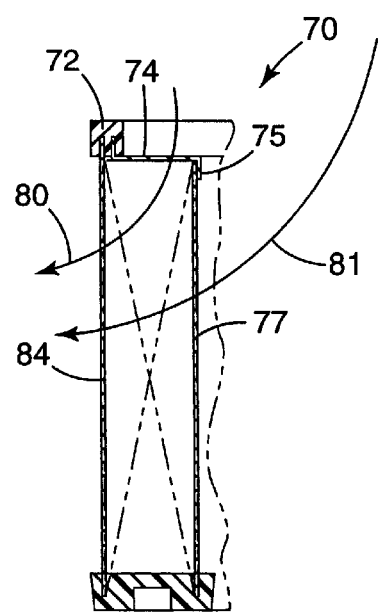
FIG. 2b is a sectional view of an alternate filter cartridge in accordance with the present invention.

FIG. 2b is a sectional view of an alternate filter cartridge 70 with a top cap 72 having one or more air flow passages 80, 81. Air flow passage 80 extends through the top mesh material 74 and outer mesh layer 84 of the filter cartridge 70. Air flow passage 81 extends through the inner mesh 77 and the outer mesh 84. The top cap 72 is constructed from an elastomeric material that secures outer mesh layer 84 to top mesh material 74. The top mesh material 74 includes a tab 75 that wraps around and is optionally attached to the inner mesh layer 77 to give the filter cartridge 70 additional structural integrity.

Figure 2C:
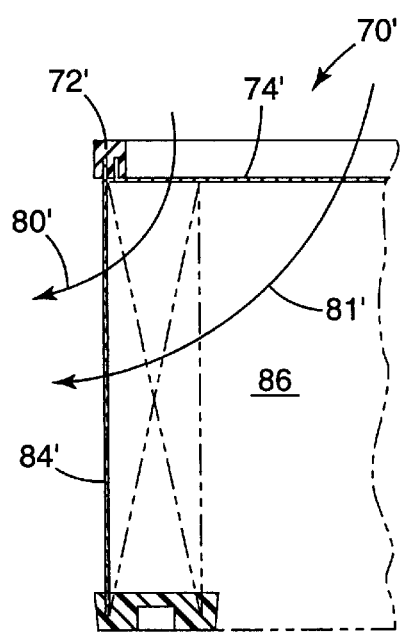
FIG. 2c is a sectional view of another alternate filter cartridge in accordance with the present invention.

FIG. 2c is a sectional view of an alternate filter cartridge 70' with a top cap 72' having one or more air flow passages 80', 81', substantially as shown in FIG. 2b. Air flow passage 80' extends through the top mesh material 74' and outer mesh layer 84' of the filter cartridge 70'. The top cap 72' secures outer mesh layer 84' to top mesh material 74'. In the embodiment of FIG. 2c, the top mesh material 74' extends across the center opening 86 to prevent debris from collecting in the filter cartridge 70'.

Figure 3:
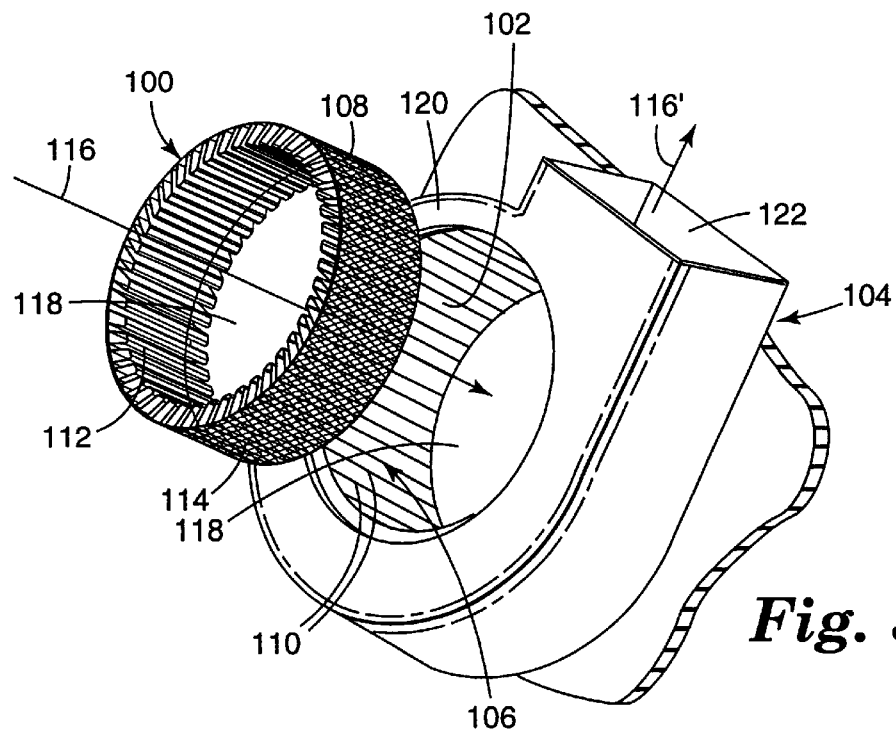
FIG. 3 is a perspective view of a filter cartridge engaged with a blower wheel in accordance with the present invention.

FIG. 3 is an exploded view of a filter cartridge 100 in accordance with the present invention and schematic blower system 104. The filter cartridge includes an inner mesh layer 112 and an outer mesh layer 114, but no end caps. In the embodiment of FIG. 3, the filter medium (not shown) is retained in the compartments by friction, adhesives and/or a variety of other mechanisms. For example, the filter medium can be retained in a pouch or bag constructed from a scrim or other porous material.

The filter cartridge 100 can be located in blower cavity 106 so that the outer filter surface 108 forms a friction fit with fan blades 110 on the blower wheel 102. Alternatively, the filter cartridge 100 may be retained to the blower wheel 102 by a variety of active removable fastening techniques including mechanical fasteners, such as clips, hooks and hook and loop fasteners, and/or retaining tabs.

As the blower wheel 102 and attached filter cartridge 100 rotate, the fan blades 110 generate a reduced pressure condition that draws air along flow path 116 into center opening 118. The pressure differential draws air through the filter cartridge 100 and ejects it radially outward through the fan blades 110 into housing 120. As pressure within the housing 120 increases, air continues along flow path 116' through air outlet 122.

The present filter cartridge 100 may be used as a conventional in-line filter for an HVAC system, such as disclosed in U.S. Pat. No. 5,683,478 (Anonychuk). Alternatively, the filter cartridge 100 may be attached to a blower wheel 102 such as illustrated in FIG. 3. Blower wheel 102 refers generically to any squirrel cage rotors, centrifugal rotors and the like. Clips or fasteners may be used to attach the filter cartridge 100 to the blower wheel 102, such as disclosed in commonly assigned U.S. Pat. Ser. No. 09/126,189, entitled Filtration System for HVAC Applications, filed Jun. 30, 1998. The filter cartridge 100 preferably has a height generally equal to the height of the blower wheel 102. In an embodiment where the filter cartridge 100 has a height less than the height of the blower wheel 102, the gap defines a flow passage that permits a portion of the air flowing through the blower system 104 to bypass the filter cartridge 100.

Figure 4:
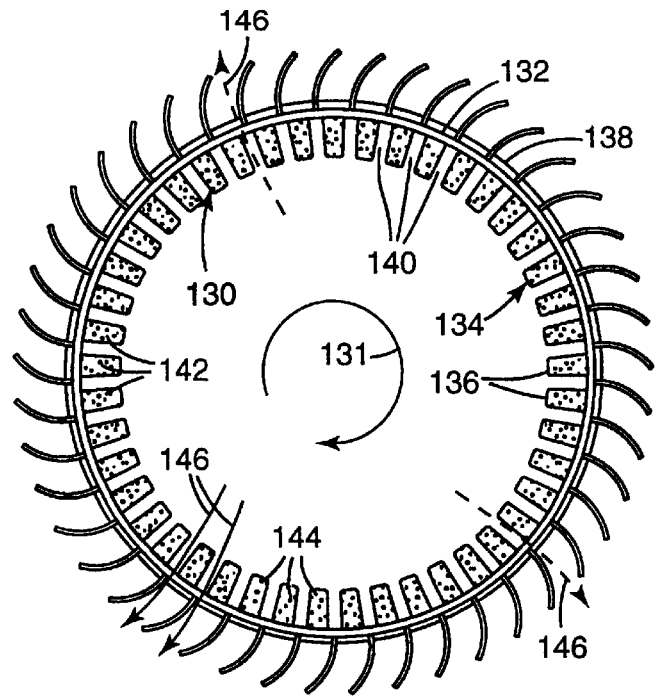
FIG. 4 is a sectional view of a filter cartridge engaged with a blower wheel in accordance with the present invention.

FIG. 4 is a sectional view of a filter cartridge 130 engaged with a blower wheel 132 in accordance with the present invention. The arrow 131 shows the direction of rotation of the assembly 130, 132. Shaped inner mesh layer 134 has a series of raised portions 136 separated by gaps 140. Outer mesh layer 138 is positioned against the inner mesh layer 134 to form radial compartments 144. Filter media 142 is deposited in the radial compartments 144 formed by the raised portions 136 abutted against the outer mesh layer 138. The number of compartments 144 can be greater than, less than or equal to the number of blades on the blower wheel 132.

The gaps 140 form air flow passages 146 through the filter cartridge 130. Consequently, when the filter media 142 is fully loaded, the substantially unimpeded air flow passages 146 maintain adequate air flow through the filter cartridge 130. The filter cartridge 130 releasably attaches to either the outside perimeter or the inside perimeter of the blower wheel 132 (see FIGS. 6 and 6a).

Figure 5:
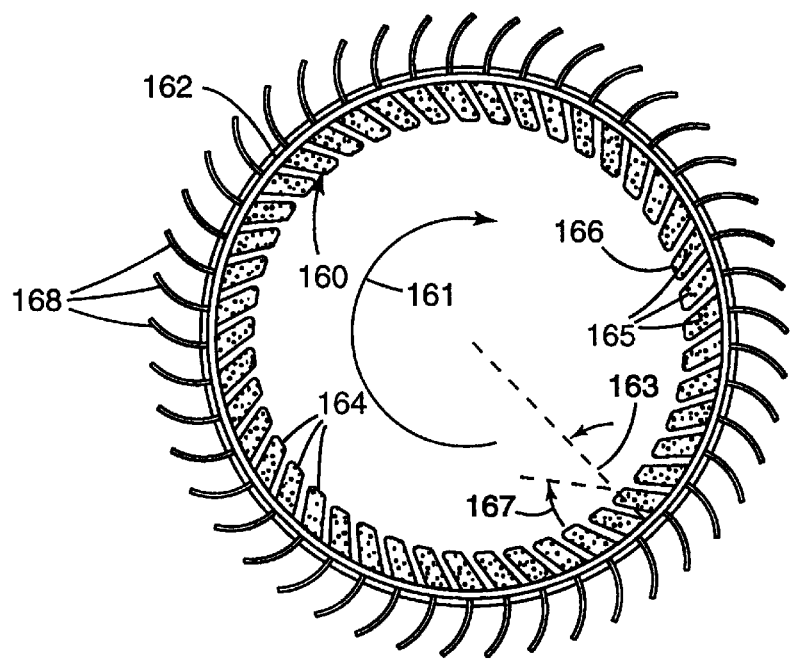
FIG. 5 is a sectional view of an alternate filter cartridge engaged with a blower wheel in accordance with the present invention.

FIG. 5 is a sectional view of an alternate filter cartridge 160 engaged with a blower wheel 162 in accordance with the present invention. The arrow 161 shows the direction of rotation of the assembly 160, 162. In the embodiment illustrated in FIG. 5, the raised portions 164 formed in the inner mesh layer 166 are canted or inclined so that the compartments 165 act as extensions of the fan blades 168. The raised portions 164 can be canted or inclined at an angle of inclination 167 of less than about 45 degrees relative to an axis 163 normal to the filter cartridge 160. A cant of −45 degrees relative to axis 163 is also possible for some applications. In an embodiment where the filter cartridge 160 is attached to the outside perimeter of the blower wheel 162, the angle of inclination 167 is reversed (the filter cartridge 160 is flipped over).

Maintaining high airflow in the blower system is critical to effectively heat and cool the cabin of a vehicle. The shaping or inclination of the raised portions 164 increases the airflow through the filter cartridge 160 and blower wheel 162. In the embodiment of FIG. 5, the raised portions 164 are aligned and in-sync with the fan blades 168. As discussed in Example 4, locating the raised portions 164 out of sync with, or offset from, the fan blades 168 does not significantly diminish airflow.

Figure 6A:
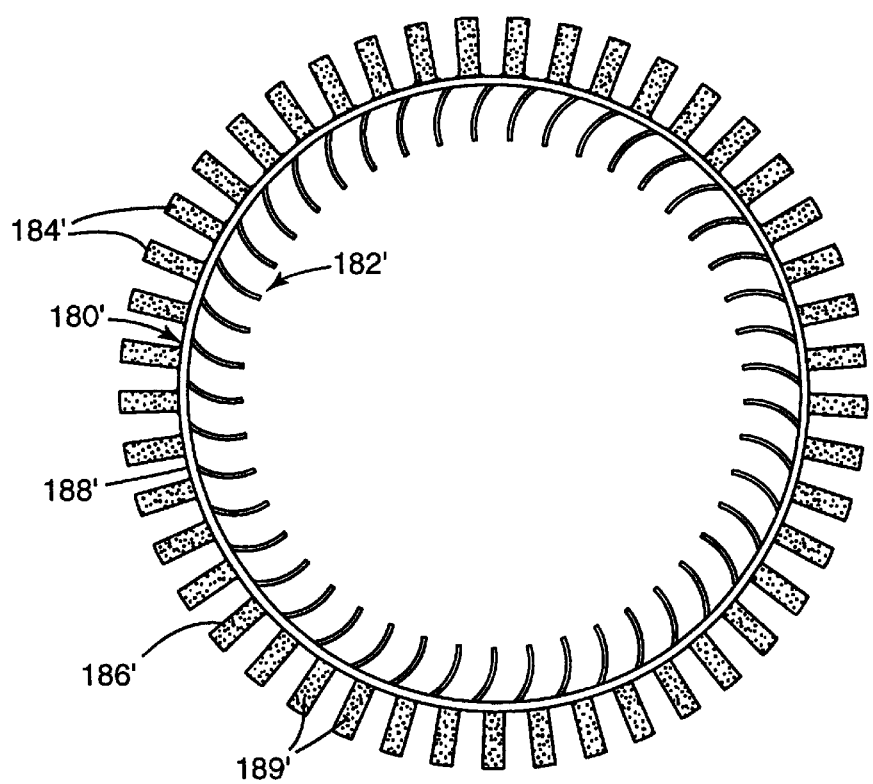
FIG. 6a is a sectional view of a filter cartridge engaged with an outer perimeter of a blower wheel in accordance with the present invention.
Figure 6:
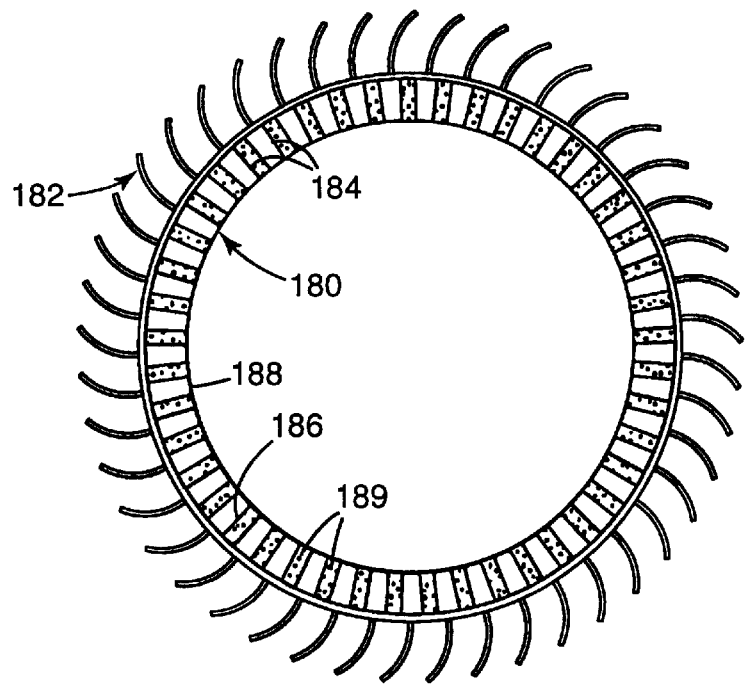
FIG. 6 is a sectional view of another alternate filter cartridge engaged with a blower wheel in accordance with the present invention.

FIG. 6 is a sectional view of an alternate filter cartridge 180 engaged with blower wheel 182 in accordance with the present invention. The embodiment of FIG. 6 corresponds generally with FIG. 4, except that the raised portions 184 are formed on the outer mesh layer 186. The inner mesh layer 188 that encloses raised portions 184 to form compartments 189 is cylindrical. In an alternate embodiment, the inner mesh layer 188 may include raised portions that may or may not be aligned with the raised portions 184 on the outer mesh layer 186.

FIG. 6a is a sectional view of an alternate filter cartridge 180' engaged with an outer perimeter of blower wheel 182' in accordance with the present invention. Raised portions 184' are formed on outer mesh layer 186'. Inner mesh layer 188' encloses raised portions 184' to form compartments 189' and engages with the outer perimeter of the blower wheel 182'.

Figure 7:
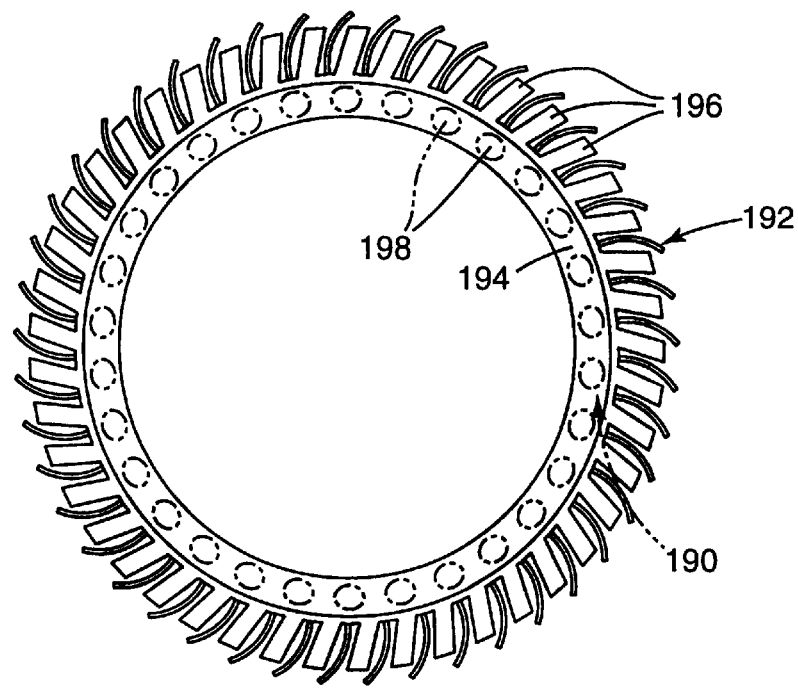
FIG. 7 is a top view of a filter cartridge engaged with a blower wheel in accordance with the present invention.

FIG. 7 is a top view of a filter cartridge 190 engaged with a blower wheel 192 in accordance with the present invention. Top cap 194 includes a series of removable weight balancing tabs 196 that can be trimmed or removed entirely to balance the blower wheel/filter cartridge assembly. Alternatively, top cap 194 may include a plurality of gaps 198 of known volume. By depositing a material of known density in the gaps 198, the same balancing procedure can be performed.

The filter media is preferably a material having a useful level of resistance to penetration or transfer of particles and/or aerosols while retaining a desirable level of gas transport through the material. Resistance to permeation or transfer of particles and/or aerosols may be measured by determining the retention (filtration) of particles and can be expressed as clean air delivery rate (CADR), as defined in ANSI Standard AC-1-1988.

The filter media may be paper, porous films of thermoplastic or thermoset materials, nonwoven webs of synthetic or natural fibers, scrims, woven or knitted materials, foams, or electret or electrostatically charged materials. The filter media may also include sorbents, catalysts, and/or activated carbon (granules, fibers, fabric, and molded shapes). Electret filter webs can be formed of the split fibrillated charged fibers as described in U.S. Pat. No. Re. 30,782. These charged fibers can be formed into a nonwoven web by conventional means and optionally joined to a supporting scrim such as disclosed in U.S. Pat. No. 5,230,800 forming an outer support layer. The support scrim can be a spunbond web, a netting, a Claf web, or the like. Alternatively, the nonwoven fibrous filter web can be a melt blown microfiber nonwoven web, such as disclosed in U.S. Pat. No. 4,817,942 which can be joined to a support layer during web formation as disclosed in that patent, or subsequently joined to a support web in any conventional manner.

EXAMPLES

Example 1

Figure 8:
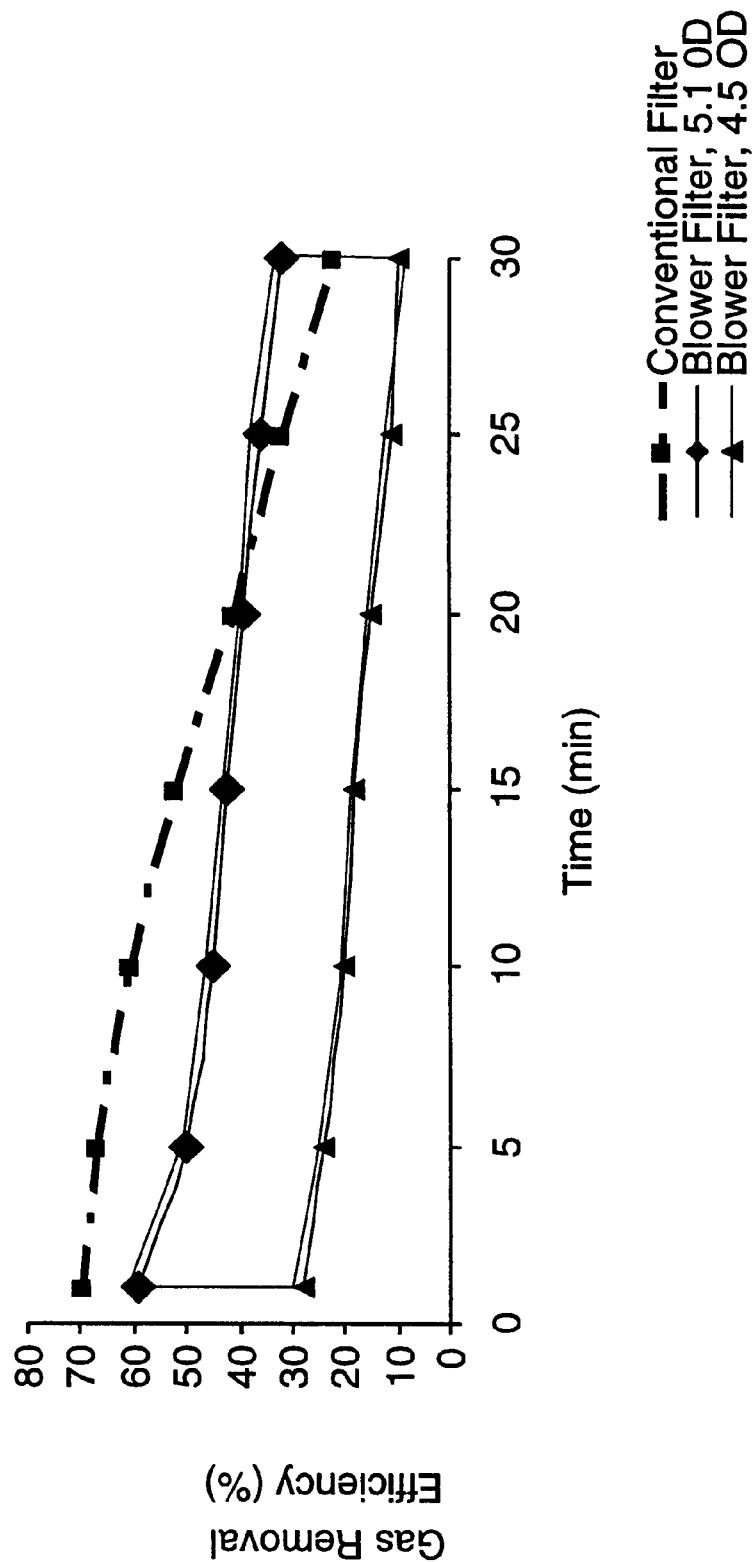
FIG. 8 is a graphic representation of data relating to gas removal efficiency of the present filter cartridges and a conventional filter cartridge.

The performance of the present filter cartridge was tested and compared to a conventional stationary cabin air filter made by Minnesota Mining and Manufacturing Company. FIG. 8 shows a comparison of the gas removal efficiency of a conventional filter and two filter cartridges according to the present invention compared to a conventional cabin air filter. The conventional filter had about 82 grams of carbon. The blower filter with a diameter of about 12.95 centimeters (5.1-inches) had about 55 grams of carbon and the 11.4 centimeters (4.5-inches) diameter blower filter had about 20 grams of carbon. Each of the blower filters had the carbon generally equally divided among about 44 compartments (equal to the number of fan blades on the blower wheel). The compartments extended radially into the center opening of the blower wheel, as generally illustrated in FIG. 4.

The test was carried out by vaporizing toluene in a vaporization chamber and delivering the vaporized toluene in a carrier stream to a blower system without a filter cartridge. The amount of toluene required to deliver a concentration of 80 parts per million at a flow rate of about 200 cubic meters/hour (117 cubic feet/minute) through the blower wheel was determined. After the concentration of toluene was determined, one of the filter cartridge described above was inserted into the blower wheel.

Each of the filter cartridges was subjected to a toluene challenge of about 80 parts per million concentration with a flow rate of about 200 cubic meters/hour (117 cubic feet/minute). In this accelerated test about 15 minutes is roughly equal to one year of use in a car. The initial airflow reduction due to the blower filter is roughly equal to the 22% flow reduction of the conventional cabin air filter. However, the conventional filter airflow decreases with time, while the blower filter did not due to the non-plugging airflow passages. That is, the failure mode of the conventional air filter is a reduction in airflow, whereas the present blower filters maintain airflow even when the filter media is saturated.

Example 2

The size of the filter and the amount of media in it largely effect filter performance. By using a slightly larger diameter blower filter, performance matching traditional cabin air filters can be achieved. However, during the design or optimization of the blower filter several other factors were found to effect performance, including the use of shaped pockets to improve airflow and an open top that improves airflow and gas removal efficiency.

Figure 9:
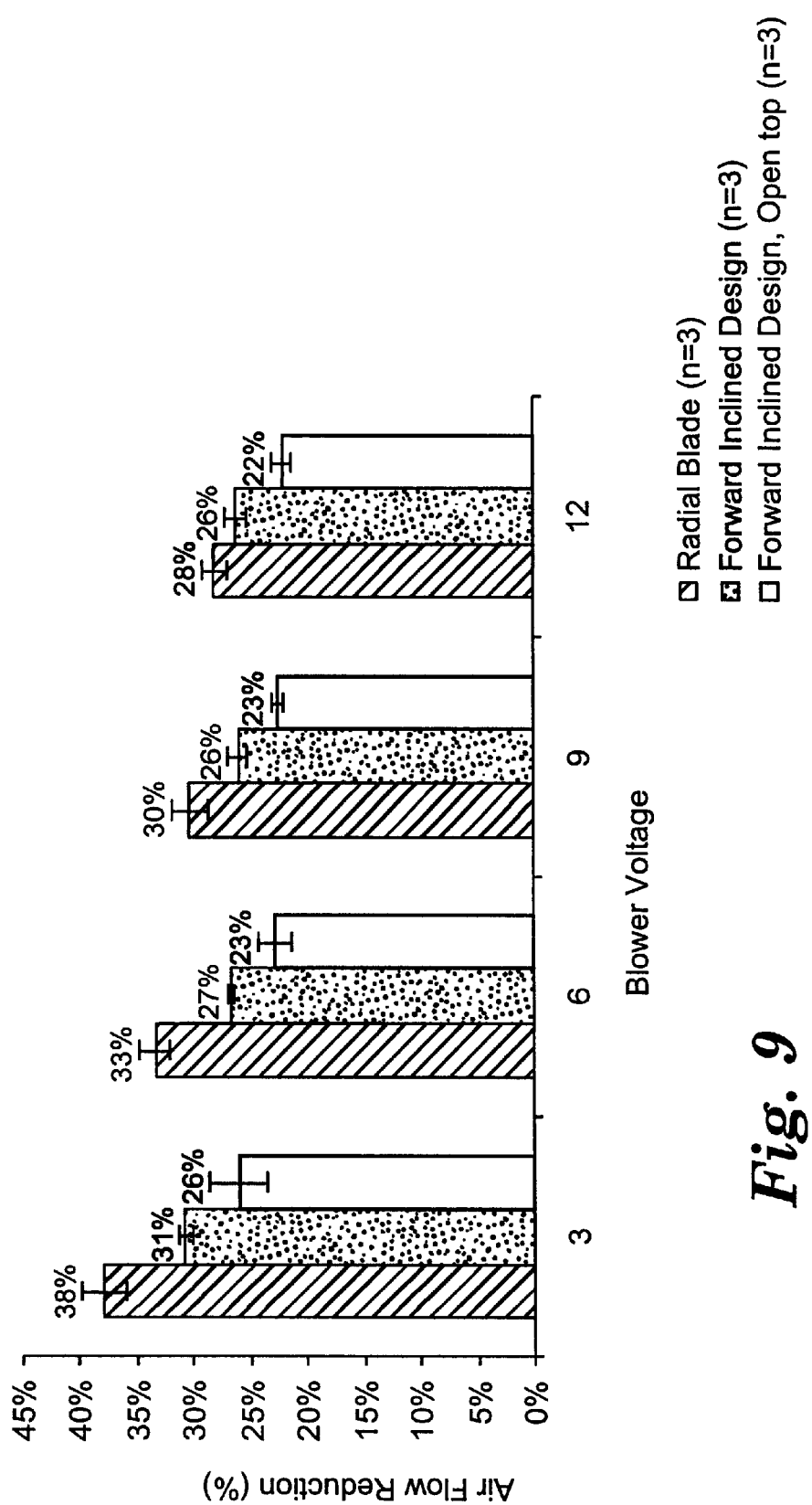
FIG. 9 is a graphic representation of data relating to shaped blade inclination on airflow performance.

A comparison of airflow using the radial shape carbon blades and inclined or canted carbon blades is shown in the FIG. 9 for various blower voltages. The angle of inclination for the shaped blades was about 25 degrees from an axis normal to the filter cartridge (radially inward along the flow passage). The Statistical bars showing the range of values are provided at the top of each bar. At all blower voltages, forward inclined shaped carbon blades resulted in greater airflow through the present filtration system than either the radial shaped carbon blades or backward curved shaped carbon blades. The greatest air flow was achieved using a filter cartridge having flow passages extending through the top cap, such as discussed in connection with FIGS. 2 and 2a.

Example 3

Figure 10:
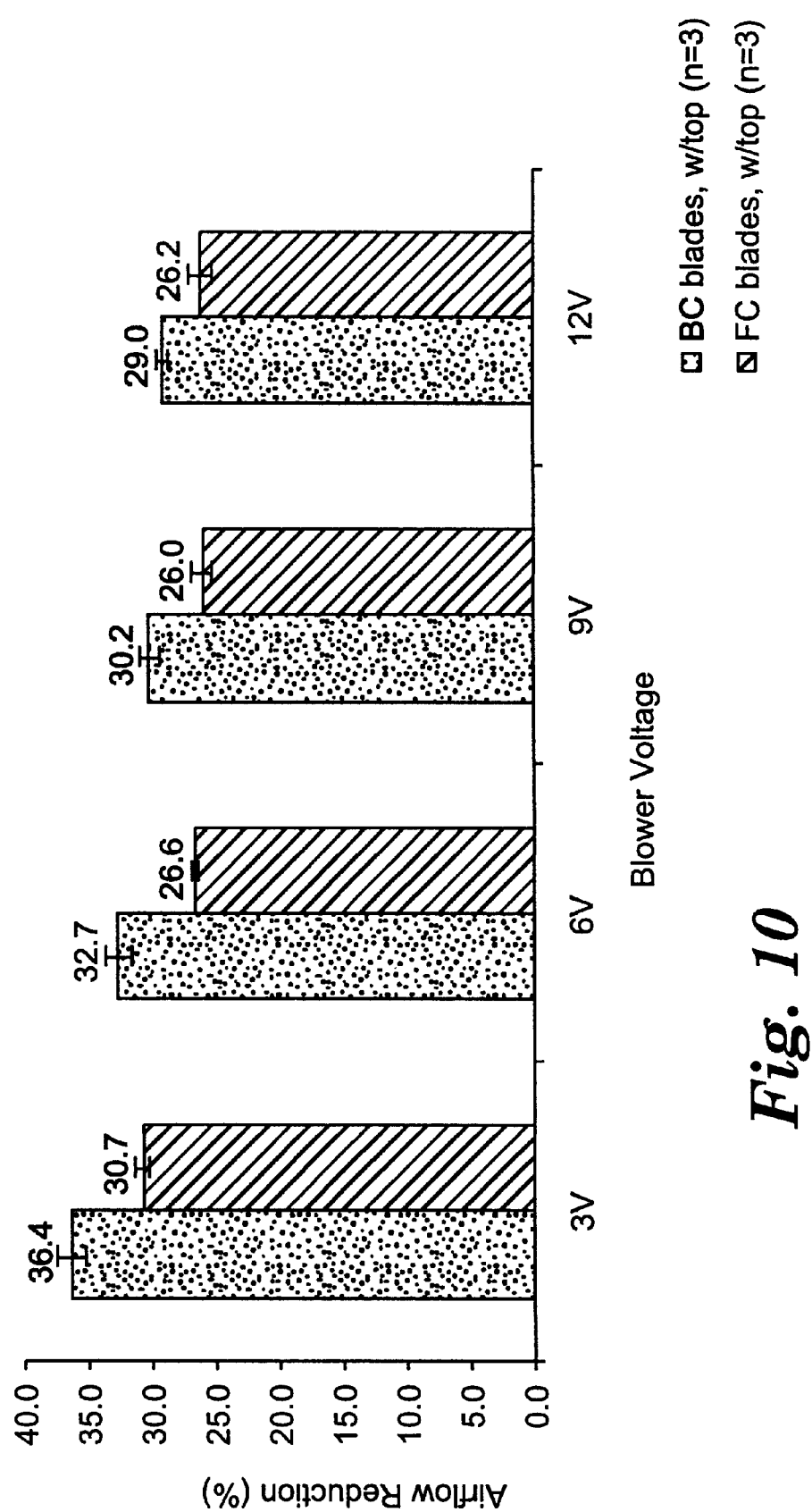
FIG. 10 is a graphic representation of data relating to shaped blade orientation on airflow performance.

FIG. 10 illustrates the result of a test to determine the effect of the incline or cant direction of the shaped carbon blades on airflow. The angle of inclination of the shaped blades was about 25 degrees from an axis normal to the filter cartridge. Statistical bars showing the range of values are provided at the top of each bar. The same filter was used for both tests. The filter was placed in the blower wheel such that the carbon pockets inclined in a backward curved (BC) configuration. The same filter was then turned over such that the carbon pockets formed a forward curved (FC) configuration. The forward curved configuration showed about an 18% improvement in airflow compared to the backward curved configuration (33% reduction vs. 27%). This test clearly shows the sensitivity of the airflow to the orientation of the carbon blades.

Example 4

A test to determine the sensitivity of the airflow to the alignment of the carbon blades with the blower wheel was carried out. The angle of inclination of the shaped blades was about 25 degrees from an axis normal to the filter cartridge. In one case the carbon blades of the filter were aligned and in-sync with the blades of the blower wheel. In the second case the blades of the filter were offset about $\frac{1}{88}^{th}$ of a revolution to the blower wheel blades. The aligned in-sync case improved the airflow by about 1%. This test established that it is not necessary to provide a feature to align the filter cartridge with the blower wheel blades.

Example 5

Figure 11:
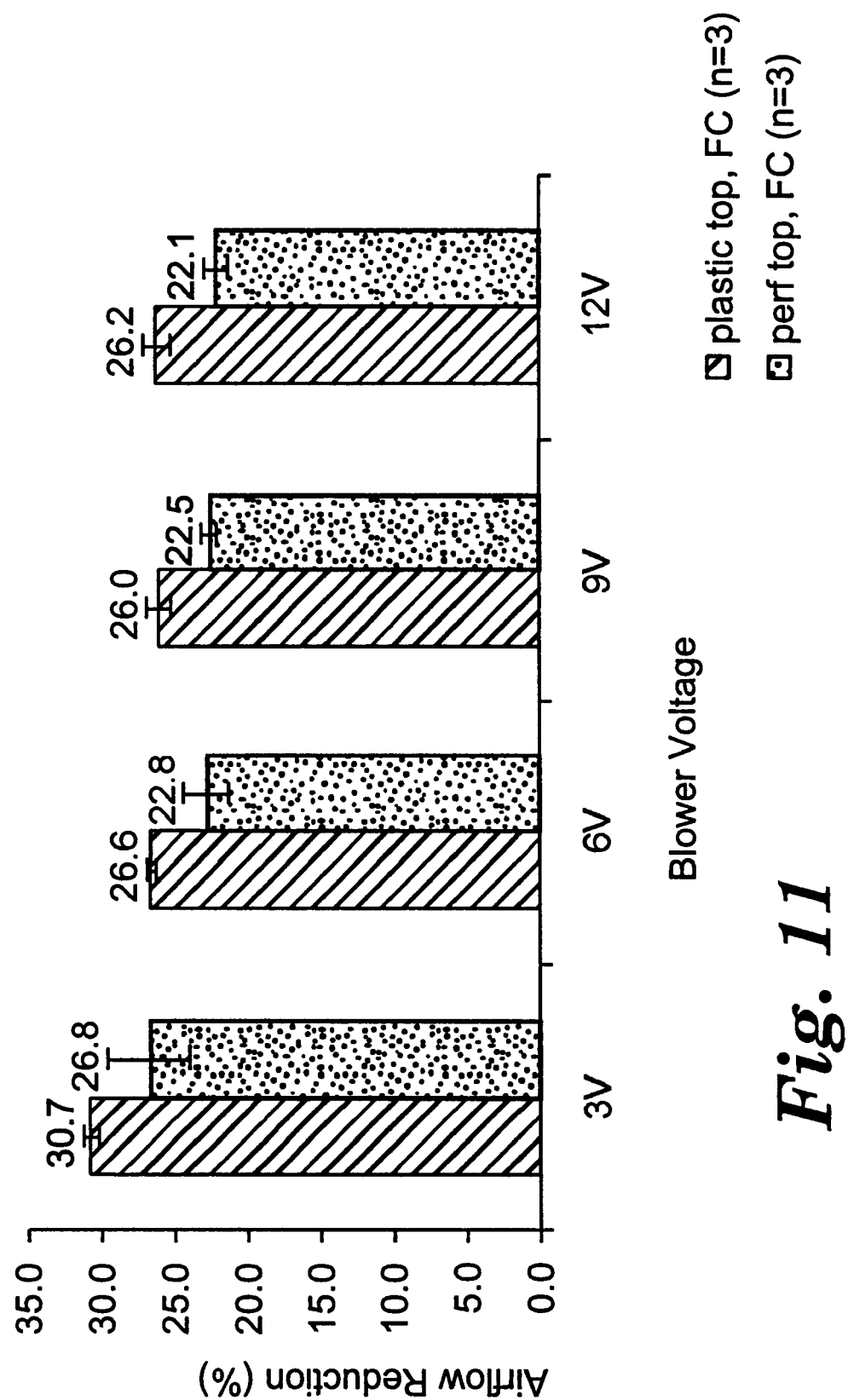
FIG. 11 is a graphic representation of data relating to permeability of the filter cartridge cap on airflow performance.

Although some type of top cap is typically required to locate the filter in the blower and to hold the carbon in place, it does not necessarily need to be a closed ring. FIG. 11 illustrates the respective airflow reduction using a perforated cap and a solid cap on the filter cartridge. The filter cartridge had a 11.4 centimeters (4.5-inches) diameter and contained about 20 grams of carbon. The angle of inclination of the shaped blades was about 25 degrees from an axis normal to the filter cartridge. Statistical bars showing the range of values are provided at the top of each bar. By using a perforated metal cap (about 70% open), the airflow of the filter was increased about 4% at various blower voltages.

Example 6

Figure 12:
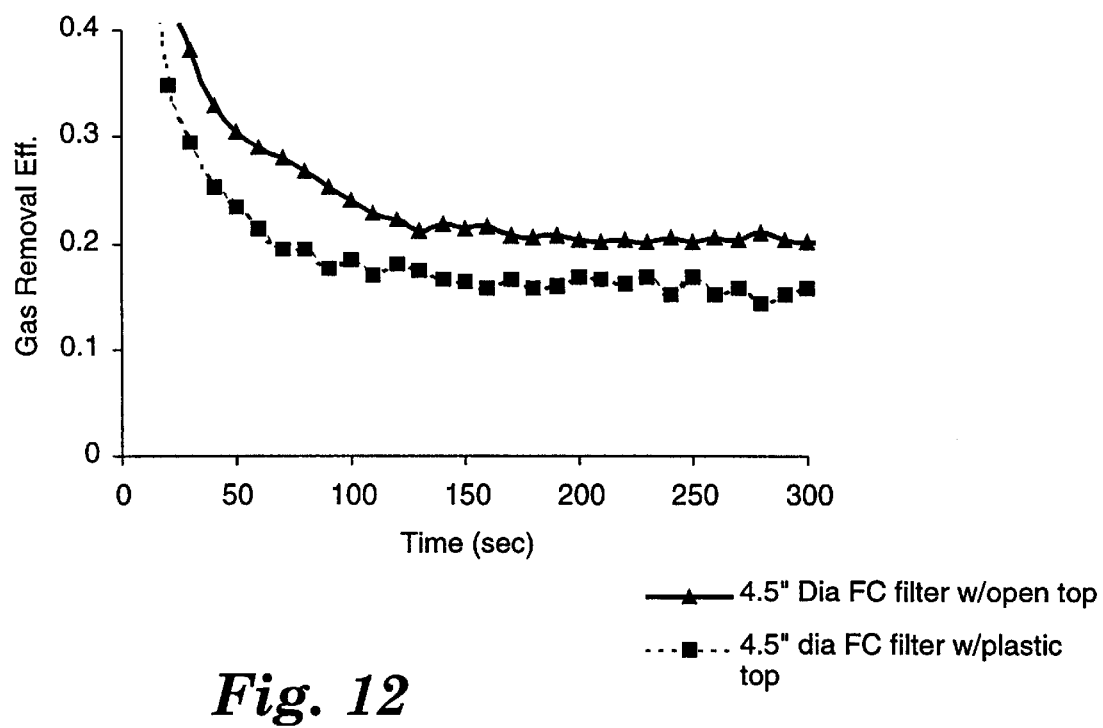
FIG. 12 is a graphic representation of data relating to permeability of the filter cartridge cap on gas removal efficiency.

Example 6 is directed to evaluating the gas removal efficiency of the filter cartridges tested in Example 5. As illustrated in FIG. 12, the gas removal efficiency of the perforated cap design was about 4–7% higher than that of the solid cap design. The gas test used toluene at a concentration of about 80 parts per million and a flow rate of about 200 cubic meters/hour (117 cubic feet per minute) as described in Example 1. This test was carried out several times with the same result.

Example 7

Figure 13:
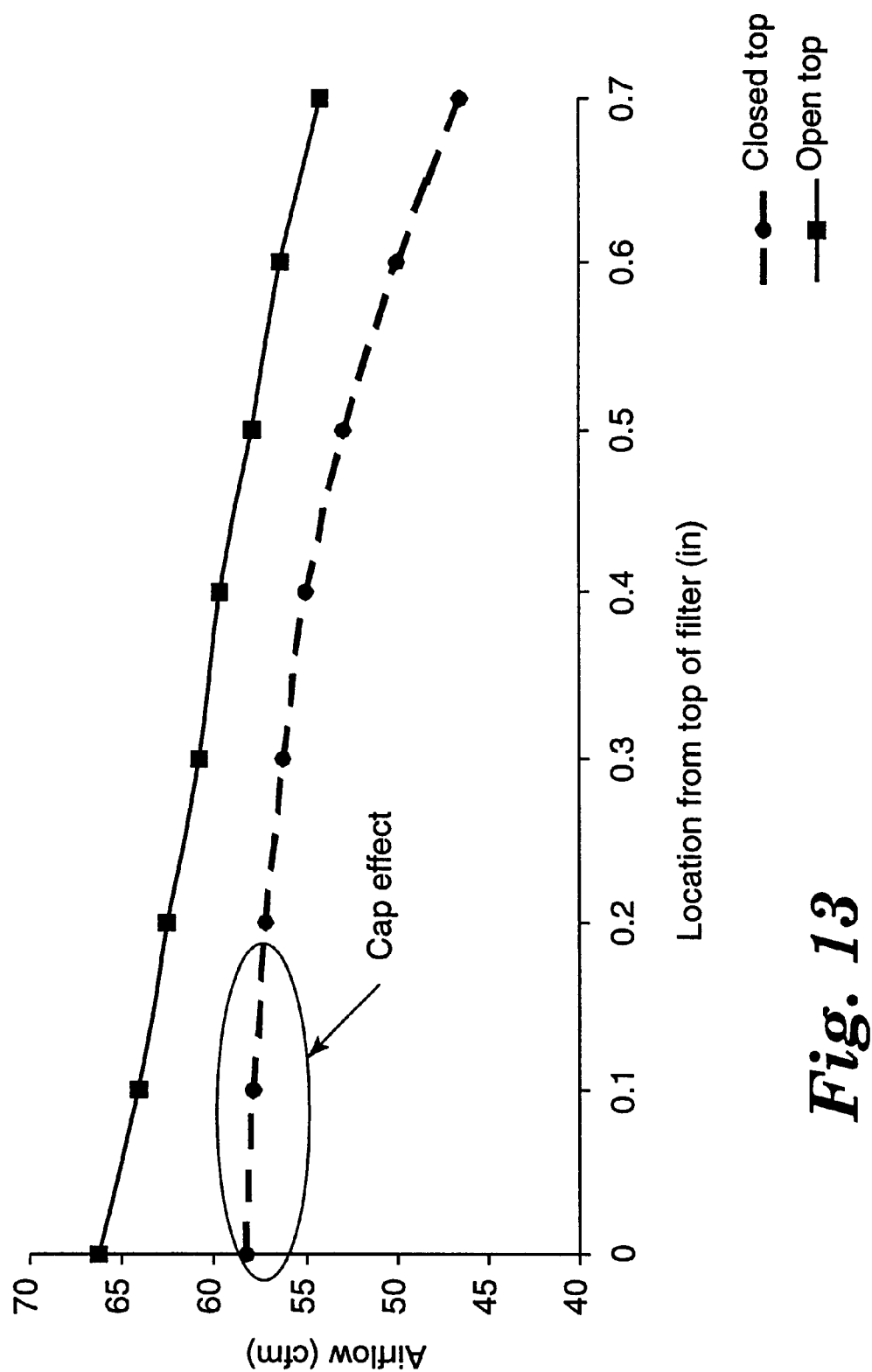
FIG. 13 is a graphic representation of data relating to permeability of the filter cartridge cap on airflow performance.

One possible explanation for the lower efficiency of the solid cap design is that the carbon located directly beneath the solid cap is not subject to much airflow. To determine if this was true, a test was conducted on a 11.4 centimeters (4.5-inches) diameter filter with 20 grams of carbon. The angle of inclination of the shaped blades was about 25 degrees from an axis normal to the filter cartridge. The same filter was used for tests with and without top caps. The filter was first tested without a top cap. A series of masking tape strips, about 2.54 millimeters (0.10 inches) in width were wrapped around the circumference of the filter beginning at the top. The open top filter showed a linear decrease in flow as progressive widths of tape masked the filter. The results are presented in FIG. 13.

The same filter was then capped and the test was repeated. This test showed that masking off about the top 5.1 millimeters (0.20 inches) of the filter with a cap did not effect the airflow, indicating that the cap was preventing air from passing through this region of the filter (see FIG. 13). Carbon located in the region below the cap filter was apparently not filtering due to the lack of flow. In a filter with about 20 grams of carbon, the cap may be blocking as much as about 2.5 grams (more than 10%) of the carbon. Consequently, it appears that the open cap design has both higher airflow and efficiency than the equivalent design with a solid cap.

The complete disclosures of all patents, patent applications, and publications are incorporated herein by reference as if individually incorporated. Various modifications and alterations of this invention will become apparent to those skilled in the art without departing from the scope and spirit of this invention, and it should be understood that this invention is not to be unduly limited to the illustrative embodiments set forth herein.

What is claimed is:

1. A filter cartridge comprising a mesh structure forming a generally annular cylinder comprising a center opening, a plurality of compartments containing a filter medium, and spaces between the compartments, the spaces between the compartments comprising substantially unimpeded air flow passages that permit airflow even when the filter medium is fully loaded.
2. The system of claim 1 wherein the compartments extend generally radially toward the center opening.
3. The system of claim 1 wherein the compartments comprise a forward angle of inclination.
4. The system of claim 1 wherein the compartments are shaped to operate as fan blades.
5. The system of claim 1 wherein the compartments comprise discrete pockets.
6. The system of claim 1 wherein the filter cartridge comprises at least one end cap.
7. The system of claim 6 comprising an air flow passage extending through the at least one end cap.
8. The system of claim 6 wherein the at least one end cap comprises weight balancing cavities.
9. The system of claim 6 wherein the at least one end cap comprises removable weight balancing tabs.
10. The system of claim 1 wherein the mesh comprises an expanded metal screen.
11. The system of claim 1 wherein the filter medium is selected from a group consisting of electret charged medium, particulate medium, sorbents medium, agglomerated carbon or combinations thereof.
12. The system of claim 1 comprising a mesh material extending across a top opening of the annular cylinder.
13. A blower system with a rotatable blower wheel having a plurality of fan blades arranged in a spaced relationship radially around a blower cavity, the blower wheel containing the filter cartridge of claim 1.
14. A filter cartridge comprising:

a mesh structure forming a generally annular cylinder having a center opening comprising a first mesh layer having a plurality of raised portions and a second mesh layer engaged with the first mesh layer such that the raised portions comprise compartments;

a filter medium retained in the compartments; and spaces between the raised portions comprising substantially unimpeded air flow passages that permit airflow even when the filter medium is fully loaded.
15. A filtration system that rotates in conjunction with a blower wheel, the blower wheel having a plurality of fan blades arranged in a spaced relationship radially around a blower cavity to define a flow path extending radially outward from the blower cavity through the fan blades when the blower wheel is rotating, the filtration system comprising:

a filter cartridge releasably attachable to the blower wheel in an engaged configuration, the filter cartridge comprising a mesh structure having a center opening and a mesh surface configured to be generally adjacent to the fan blades and to extend across at least a portion of the flow path when in the engaged configuration, the mesh structure comprising a plurality of compartments containing a filter medium and a plurality of substantially unimpeded air flow passages that permit airflow even when the filter medium is fully loaded.
16. The system of claim 15 wherein the mesh structure comprises a first mesh layer having a plurality of raised portions and a second mesh layer engaged with the first mesh layer such that the raised portions comprise the compartments and spaces between the raised portions comprise the air flow passages.
17. The system of claim 16 wherein the raised portions are shaped to operated as fan blades.
18. The system of claim 15 wherein the filter cartridge is located on one of an inner perimeter or an outer perimeter of the blower wheel.
19. The system of claim 15 wherein the filter cartridge comprises an annular cylinder with at least one end cap.
20. The system of claim 19 comprising an air flow passage extending through the at least one end cap.
21. The system of claim 19 wherein the at least one end cap comprises a friction fit with the blower wheel.
22. The system of claim 19 wherein the at least one end cap comprises weight balancing cavities.
23. The system of claim 19 wherein the at least one end cap comprises removable weight balancing tabs.
24. The system of claim 15 wherein the filter medium comprises agglomerated carbon.
25. The system of claim 15 further comprises at least one fastener for releasably retaining the filter cartridge to the blower wheel.
26. An HVAC system comprising an outside air inlet and outlet and conduit containing the blower wheel and filtration system of claim 15.

* * * * *